(12) United States Patent
Suzuki

(10) Patent No.: US 8,099,527 B2
(45) Date of Patent: Jan. 17, 2012

(54) OPERATION MANAGEMENT APPARATUS, DISPLAY METHOD, AND RECORD MEDIUM

(75) Inventor: Toru Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 12/362,031

(22) Filed: Jan. 29, 2009

(65) Prior Publication Data

US 2009/0292832 A1 Nov. 26, 2009

(30) Foreign Application Priority Data

May 21, 2008 (JP) ................................. 2008-132672

(51) Int. Cl.
*G06F 3/00* (2006.01)
*G06F 15/173* (2006.01)
*G06F 15/16* (2006.01)

(52) U.S. Cl. ............ 710/15; 710/18; 709/223; 709/224; 709/252

(58) Field of Classification Search ........................ None
See application file for complete search history.

(56) References Cited

U.S. PATENT DOCUMENTS

| 6,018,344 | A * | 1/2000 | Harada et al. ................. 715/818 |
| 7,315,985 | B1 * | 1/2008 | Gauvin et al. ................ 715/734 |
| 7,418,376 | B1 * | 8/2008 | Feldstein et al. ............... 703/21 |
| 2002/0002606 | A1 * | 1/2002 | Jaffe ............................ 709/223 |
| 2004/0210348 | A1 * | 10/2004 | Imhof et al. .................. 700/275 |
| 2005/0165922 | A1 * | 7/2005 | Hatano ........................ 709/223 |
| 2007/0018984 | A1 * | 1/2007 | Sauvageau ................... 345/440 |
| 2007/0288460 | A1 * | 12/2007 | Teramoto et al. ................ 707/6 |

FOREIGN PATENT DOCUMENTS

| JP | 11-31154 | 2/1999 |
| JP | 2004-171323 | 6/2004 |
| JP | 2006-072666 | 3/2006 |

* cited by examiner

*Primary Examiner* — Henry Tsai
*Assistant Examiner* — Kris Rhu
(74) *Attorney, Agent, or Firm* — Staas & Halsey LLP

(57) ABSTRACT

An operation management device manages the operations of managed devices, and includes: an information collection unit for acquiring communication data between the managed devices; and a calculation unit for calculating coordinates when the managed devices are arranged on a two-dimensional plane.

15 Claims, 28 Drawing Sheets

Figure 1:
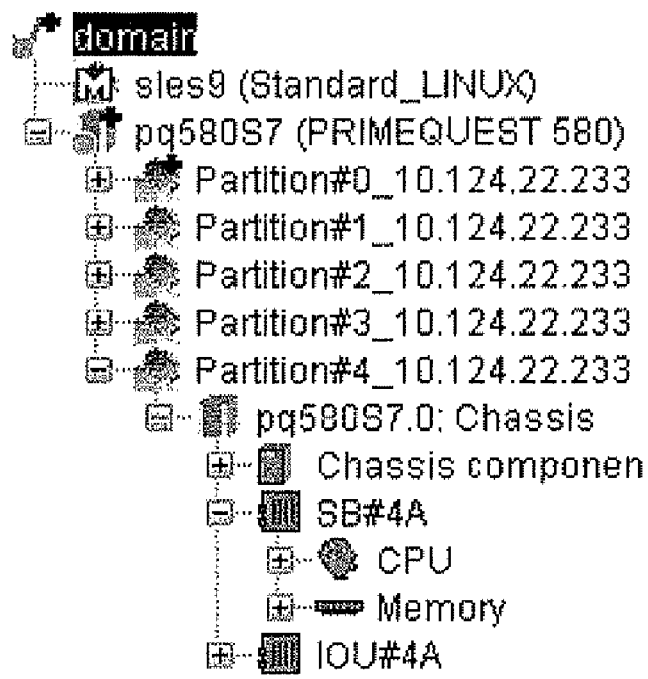

| Node | Communication name | Communication Address |
|---|---|---|
| MMBH#0_10.124.22.233 | | 10.124.22.233 |
| MMBH#1_10.124.22.233 | | 10.124.22.233 |
| Partition#0_10.124.22.233 | | 0.0.0.0 |
| Partition#10_10.124.22.233 | PQ-MWTEST-2 | 10.124.22.145 |
| Partition#11_10.124.22.233 | | 0.0.0.0 |
| Partition#12_10.124.22.233 | RHEL4U5 | 10.124.22.174 |
| Partition#14_10.124.22.233 | linux-6ds3 | 10.124.22.167 |
| Partition#15_10.124.22.233 | | 0.0.0.0 |
| Partition#1_10.124.22.233 | localhost.localdomain | 10.124.22.122 |
| Partition#2_10.124.22.233 | PQ-MWTEST-1 | 10.124.22.142 |
| Partition#3_10.124.22.233 | pcl01 | 10.124.22.242 |

FIG. 2          PRIOR ART

| COMMUNICATION TIME | TRANSMISSION ADDRESS | RECEPTION ADDRESS | DATA SIZE |
|---|---|---|---|

F I G. 8

| COMMUNICATION TIME | TRANSMISSION ADDRESS | RECEPTION ADDRESS | DATA SIZE |
|---|---|---|---|
| 2007/10/4 16:48:20 | 192.168.0.1 | 192.168.0.2 | 219 |
| 2007/10/4 16:48:21 | 192.168.0.1 | 192.168.0.2 | 139 |
| 2007/10/4 16:48:23 | 192.168.0.1 | 192.168.0.2 | 223 |

FIG. 9

| COMMUNICATION TIME | TRANSMISSION ADDRESS | RECEPTION ADDRESS | DATA SIZE |
|---|---|---|---|
| 2007/10/4 16:48:20 | 192.168.0.2 | 192.168.0.1 | 24 |
| 2007/10/4 16:48:22 | 192.168.0.2 | 192.168.0.1 | 312 |
| 2007/10/4 16:48:25 | 192.168.0.2 | 192.168.0.1 | 64 |

FIG. 10

| Name | IP address | Model | User name | User e-mail | Agent existence |
|---|---|---|---|---|---|
| Server A | 192.168.0.1 | AAA | Taro | taro@○×△.com | exist |
| Server B | 192.168.0.2 | BBB | Taro | taro@○×△.com | exist |
| Storage A | 192.168.0.3 | CCC | Jiro | jiro@○×△.com | not exist |

F I G. 1 2

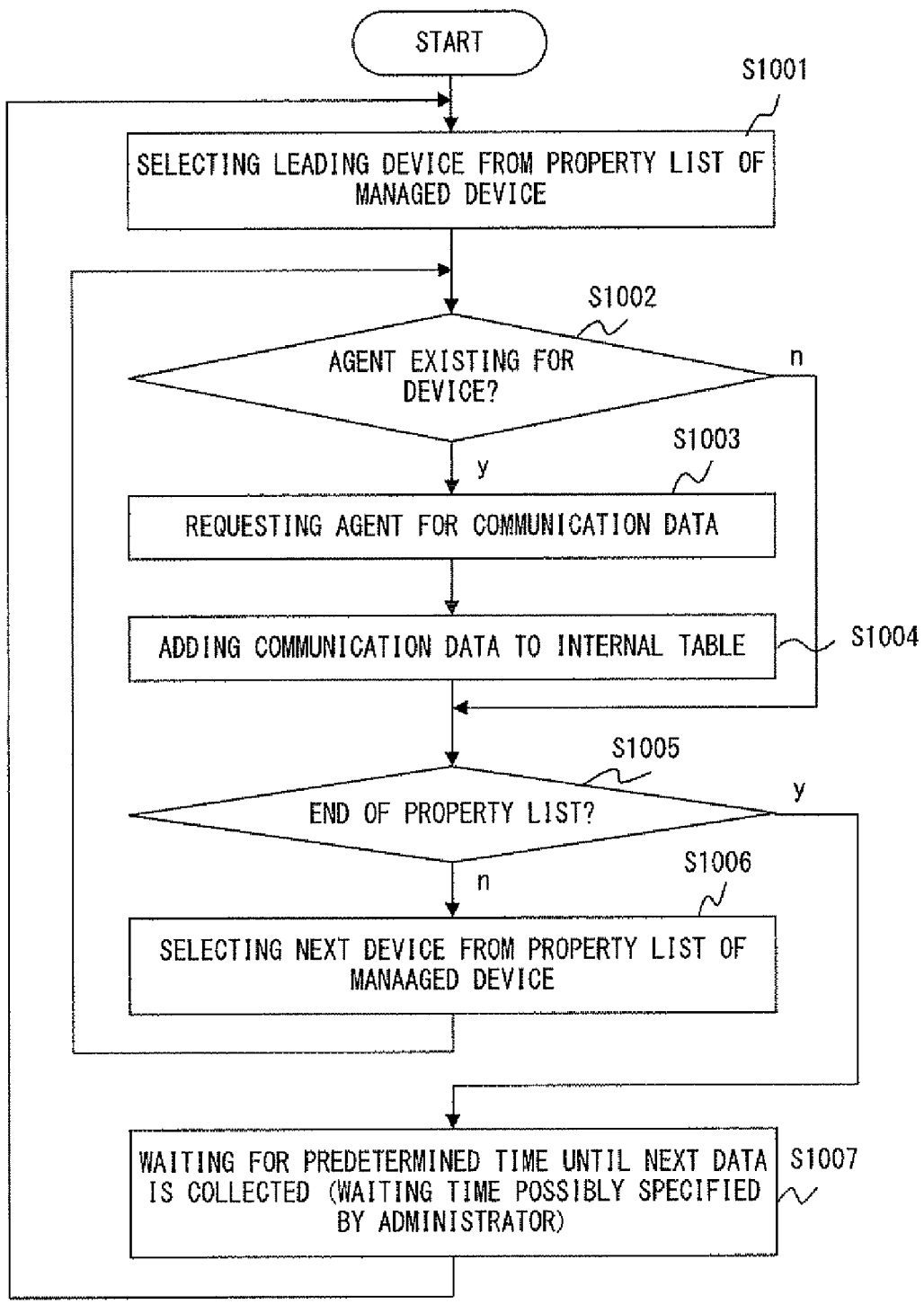
F I G. 13

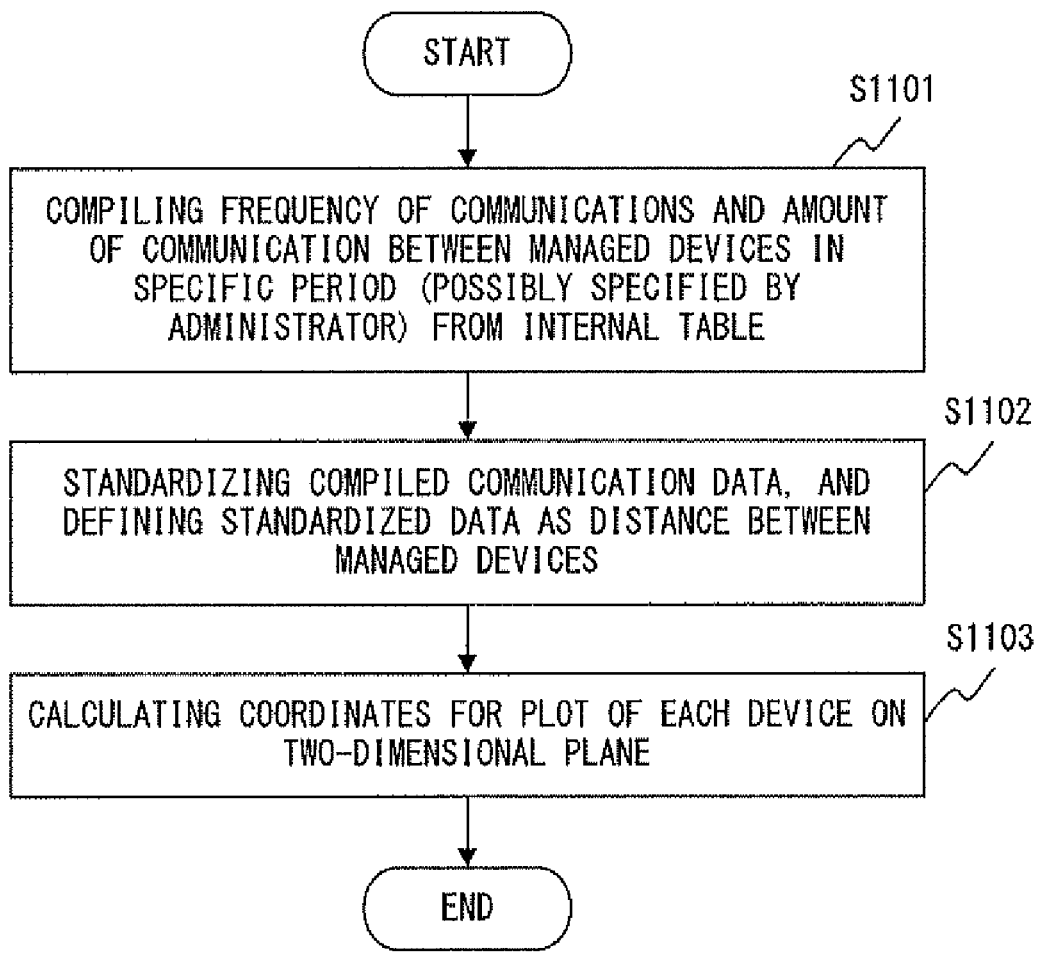
F I G. 14

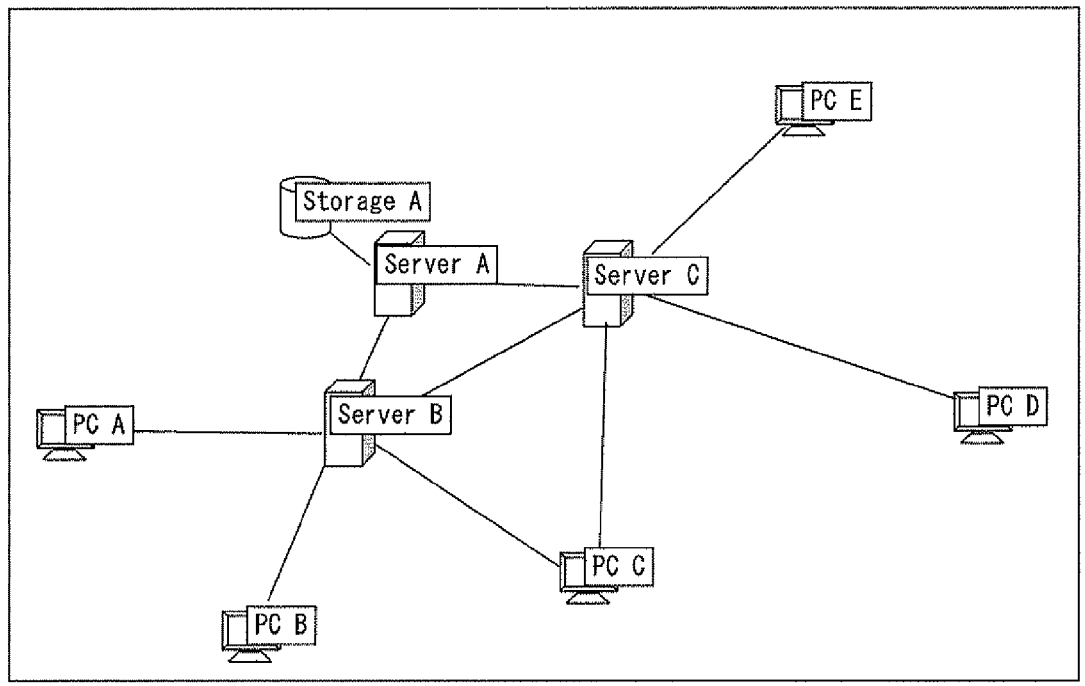
F I G. 15

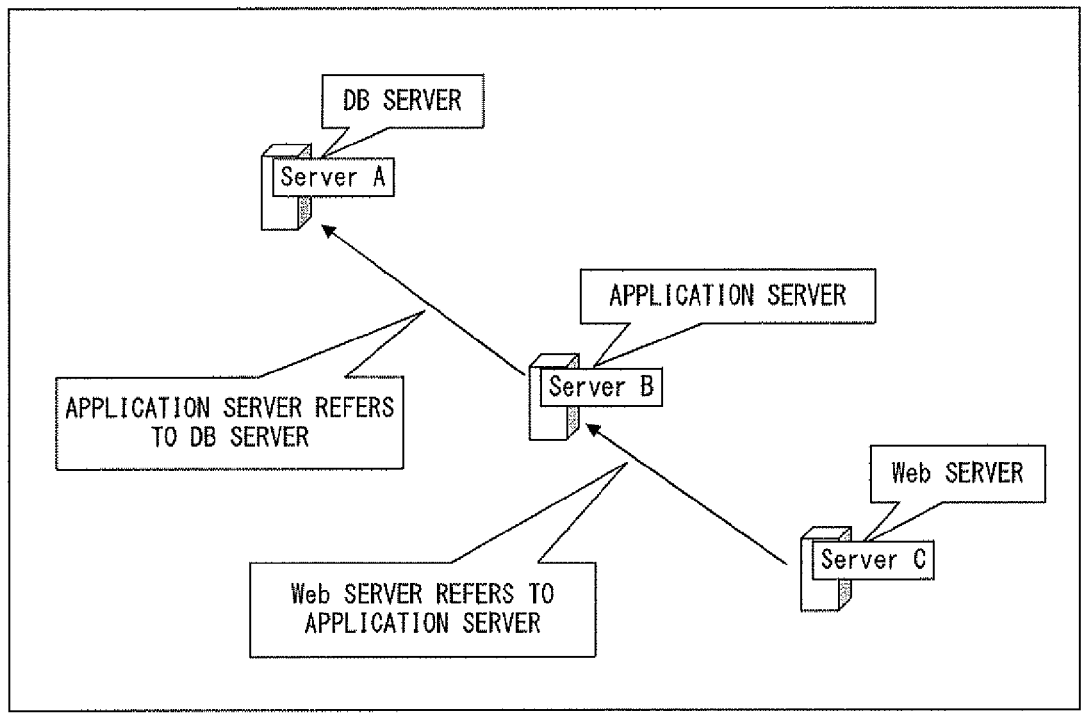
F I G. 17

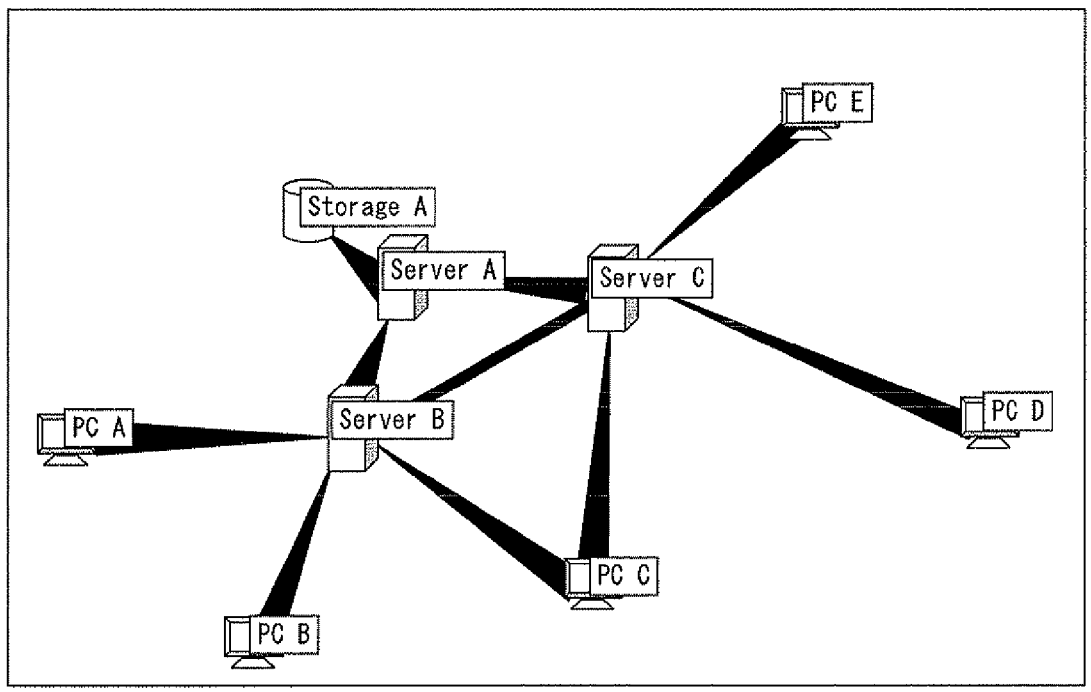
F I G. 19

| Name | IP address | Model | User name | User e-mail | Data size (DESCENDING ORDER) |
|---|---|---|---|---|---|
| Server A | 192.168.0.1 | AAA | Taro | taro@○×△.com | 867212 |
| Server B | 192.168.0.2 | BBB | Taro | taro@○×△.com | 164410 |
| PC E | 192.168.0.4 | DDD | Toru | toru@○×△.com | 2209 |

FIG. 20

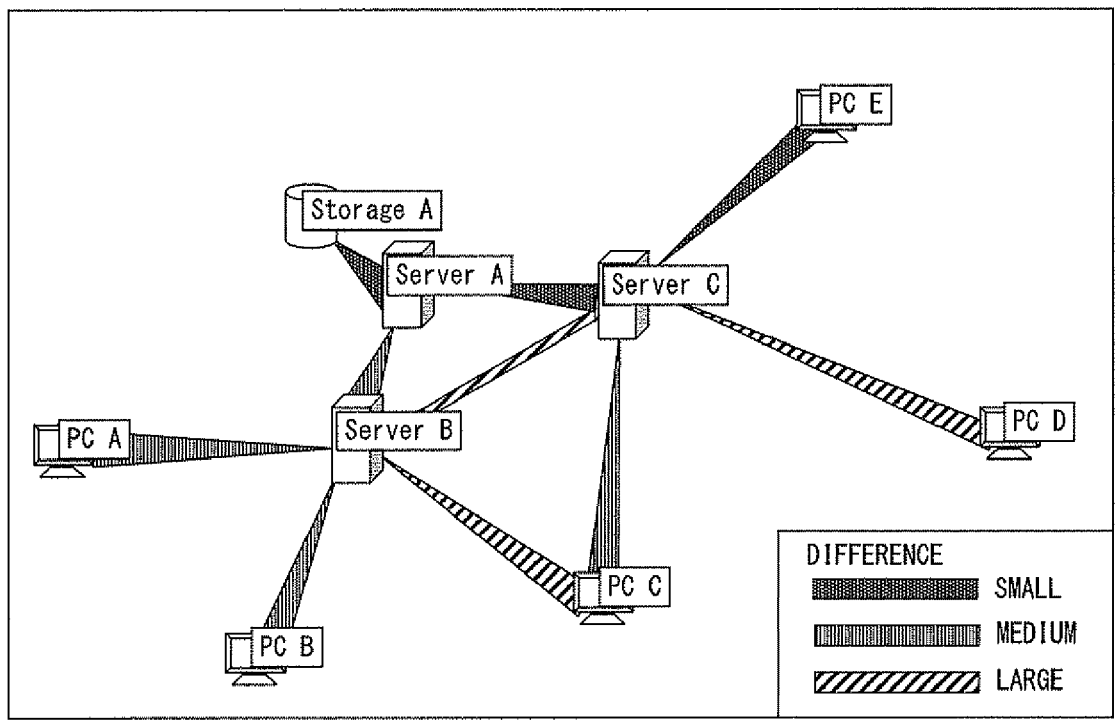
F I G. 2 1

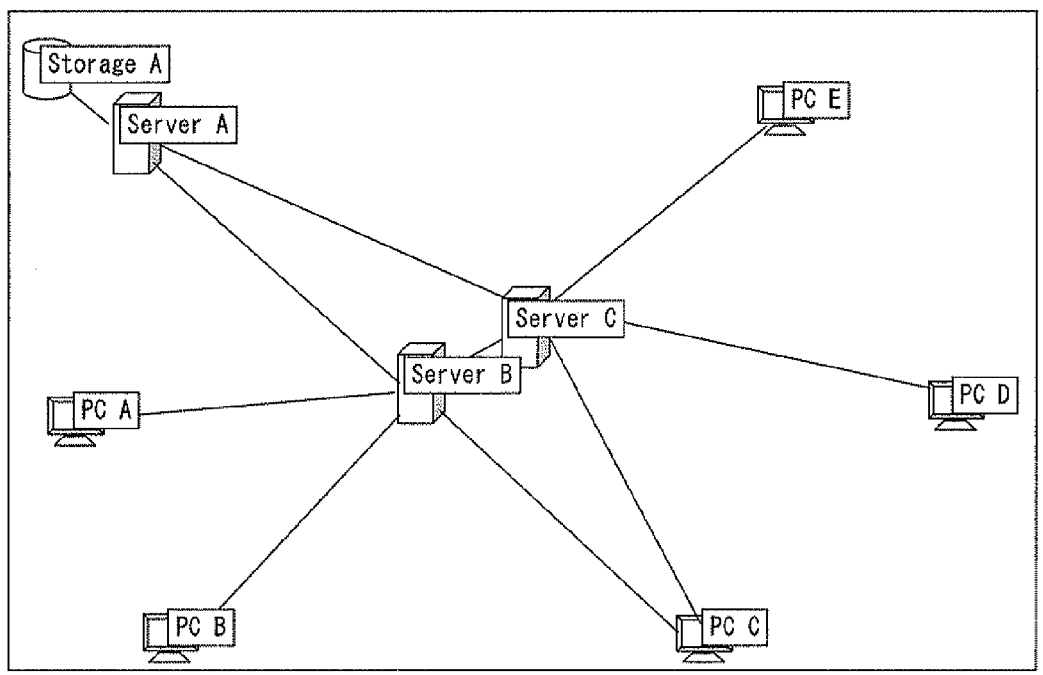
F I G. 2 3

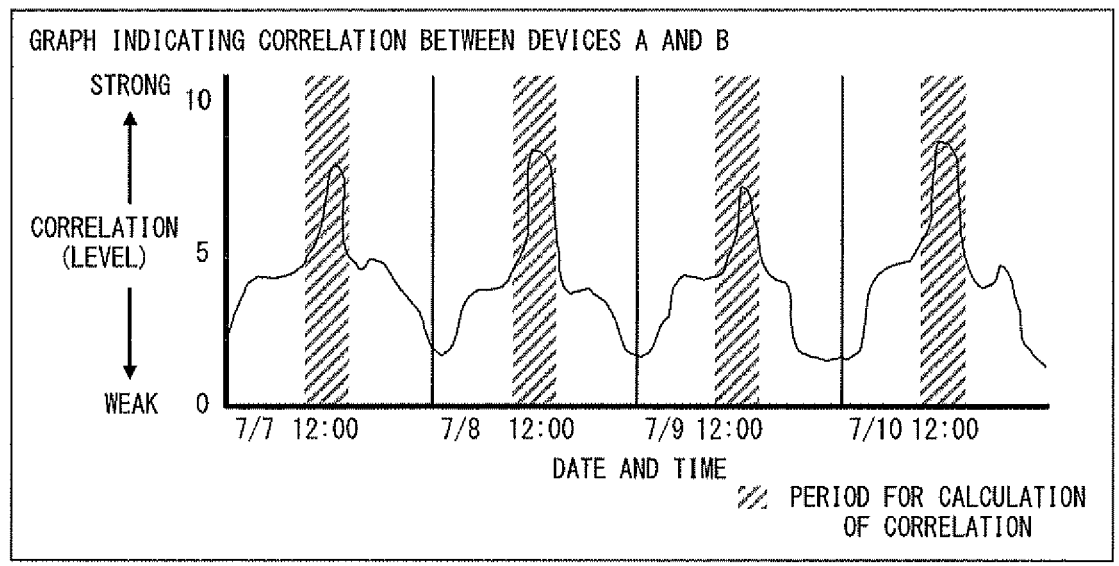
F I G. 2 4

| TIME PERIOD | MAXIMUM LEVEL |
|---|---|
| 7/7 12:00~18:00 | 8 |
| 7/10 12:05~17:00 | 7 |

FIG. 26

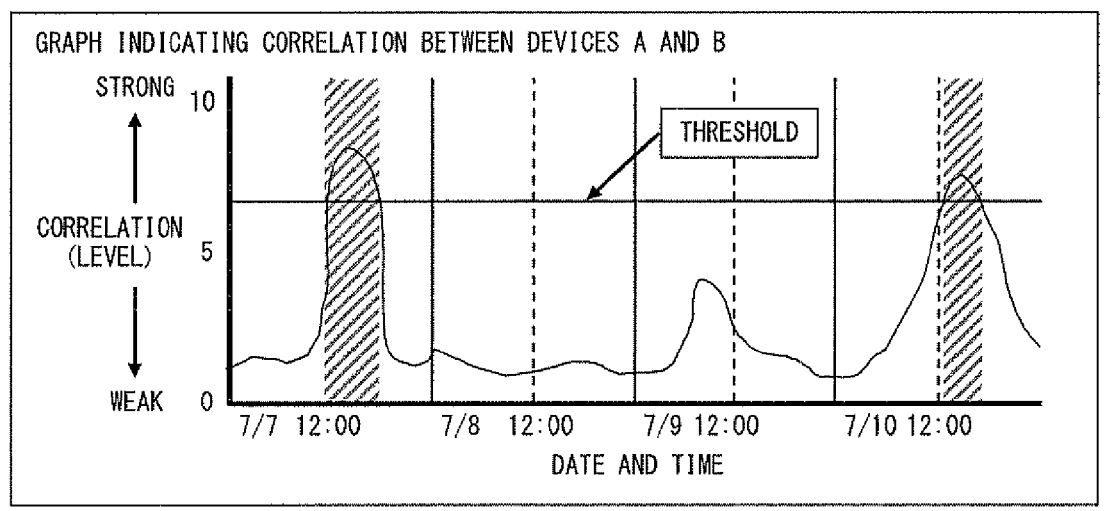
F I G. 27

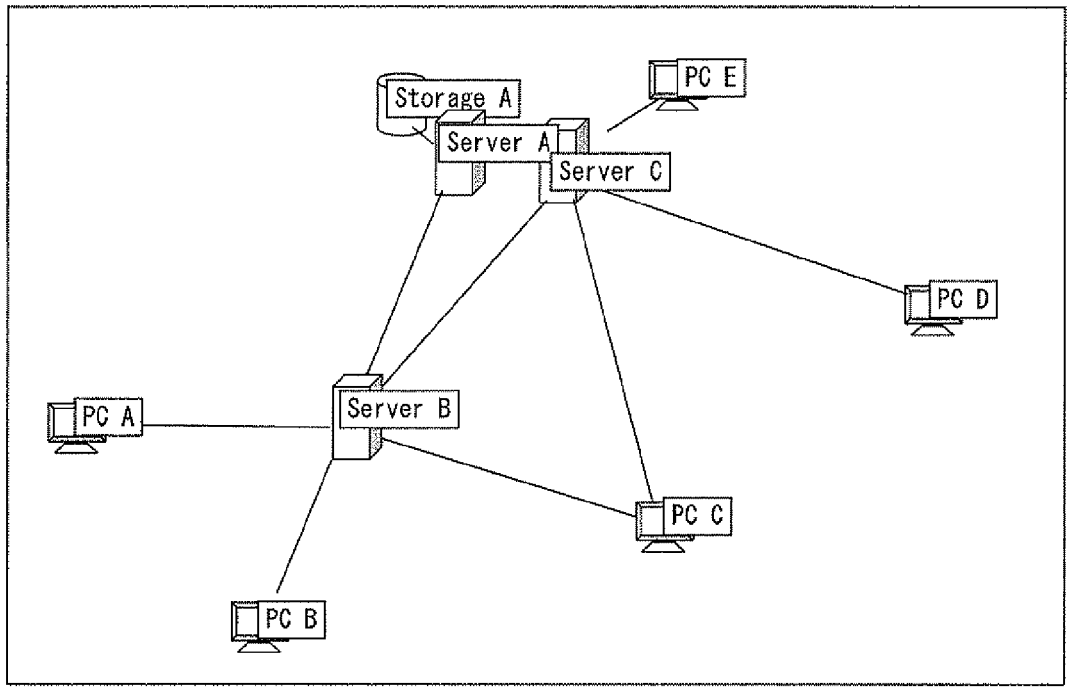
F I G. 2 8

OPERATION MANAGEMENT APPARATUS, DISPLAY METHOD, AND RECORD MEDIUM

CROSS-REFERENCE TO RELATED APPLICATION(S)

This application is based upon and claims the benefit of priority of the prior Japanese Patent Application No. 2008-132672, filed on May 21, 2008, the entire contents of which are incorporated herein by reference.

FIELD

The embodiments discussed herein are related to a operation management apparatus for managing the operation of a device to be managed such as a server, a storage device, etc.

BACKGROUND

With the progress of IT technology and the widespread use of the technology in various applications, a large number of information processing devices such as a server, a storage device, etc. have been used. Normally, these devices are associated with, in addition to a user, an administrator for performing managing operations by monitoring a device, exchanging a part, updating a system, etc. Since the load of an administrator becomes heavier with an increasing number of devices to be managed, operation management software for supporting the managing operations has been developed for use by an administrator.

Figure 3:
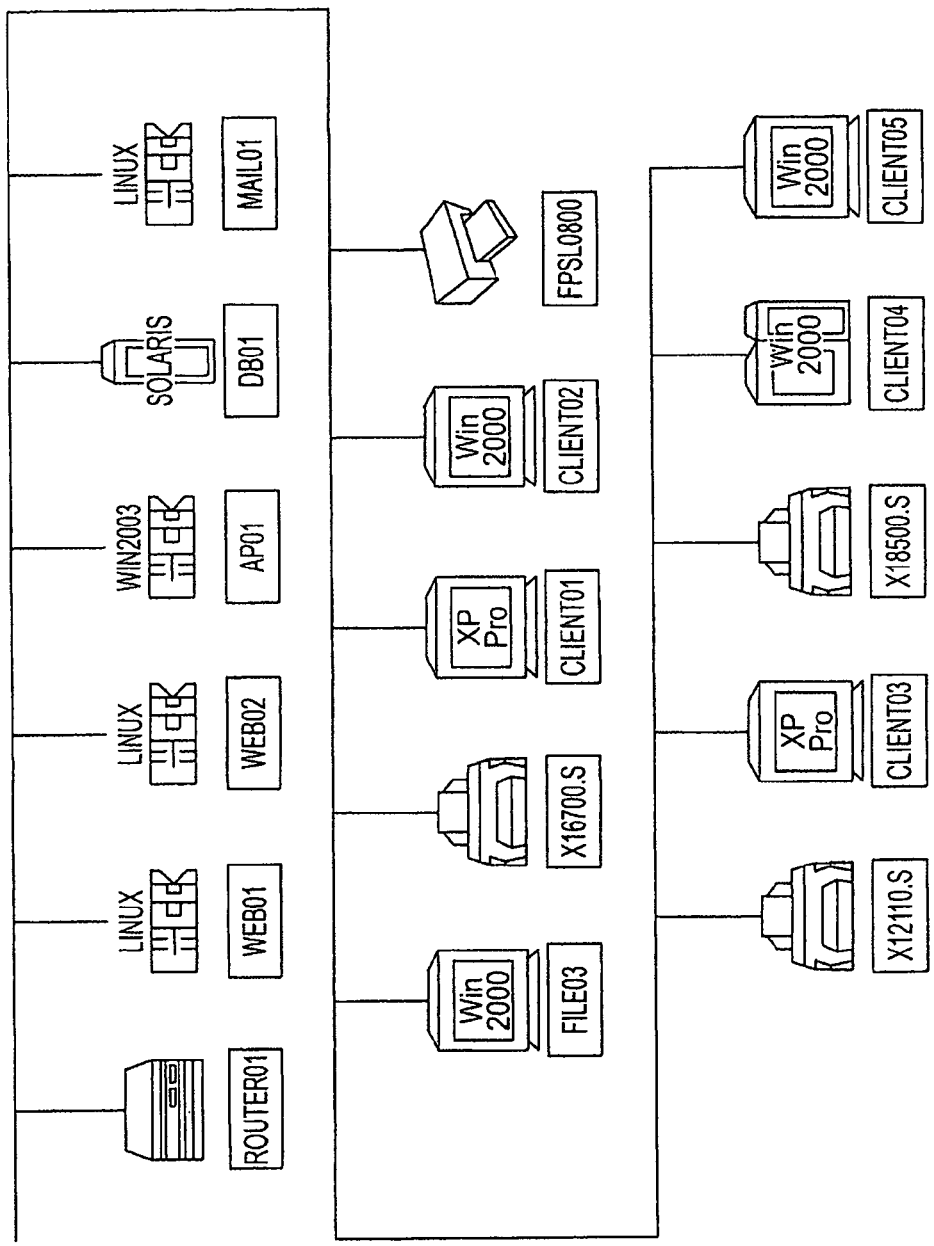

The operation management software displays a list of devices to be managed through a GUI (graphic user interface), and the administrator monitors and operates a device on the screen. The list of devices can be displayed in a tree format as depicted in FIG. 1, a table format as depicted in FIG. 2, or a connection diagram on the basis of physical connection as depicted in FIG. 3.

There also is well-known technology of displaying a result of a basket analysis related to a data analysis (for example, refer to patent document 1).

[Patent Document 1]

Japanese Laid-open Patent Publication No. 11-31154

SUMMARY

According to an aspect of the invention, an operation management apparatus that manages the operations of a managed devices includes an information collection unit for acquiring communication data between the managed devices, a calculation unit for calculating the coordinates when the managed devices are arranged on a two-dimensional plane, and an output unit for outputting the coordinates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWING(S)

Figure 4:
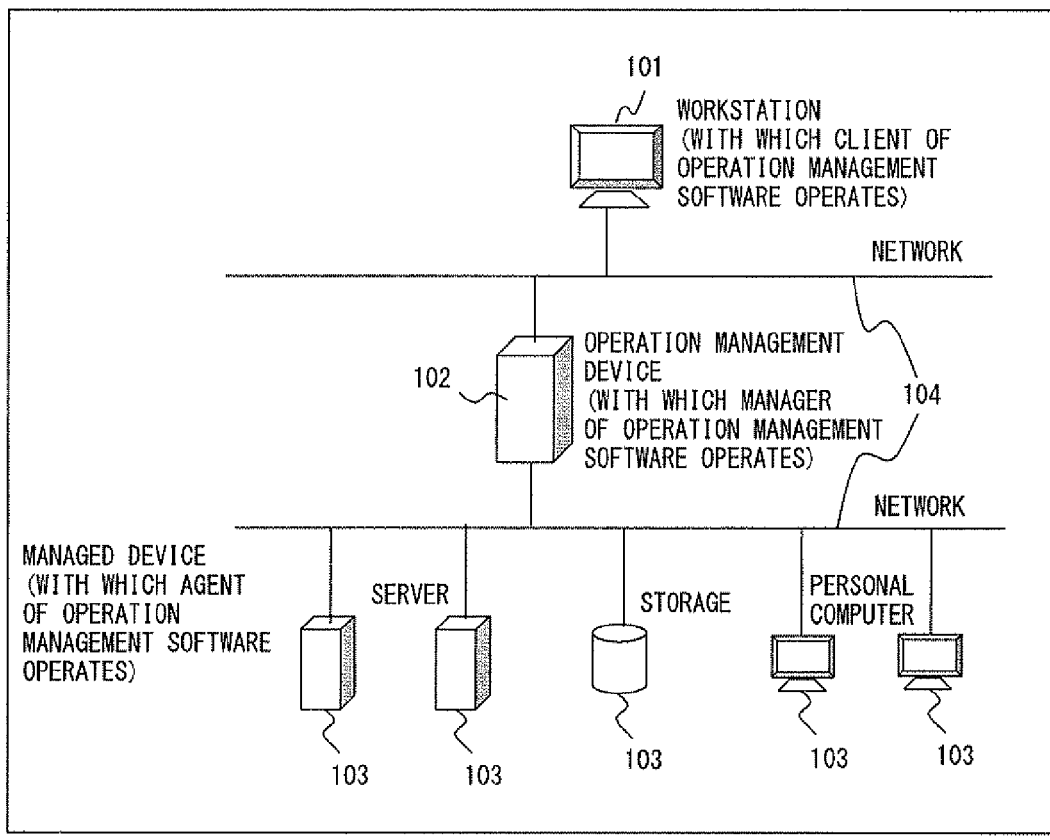
Figure 5:
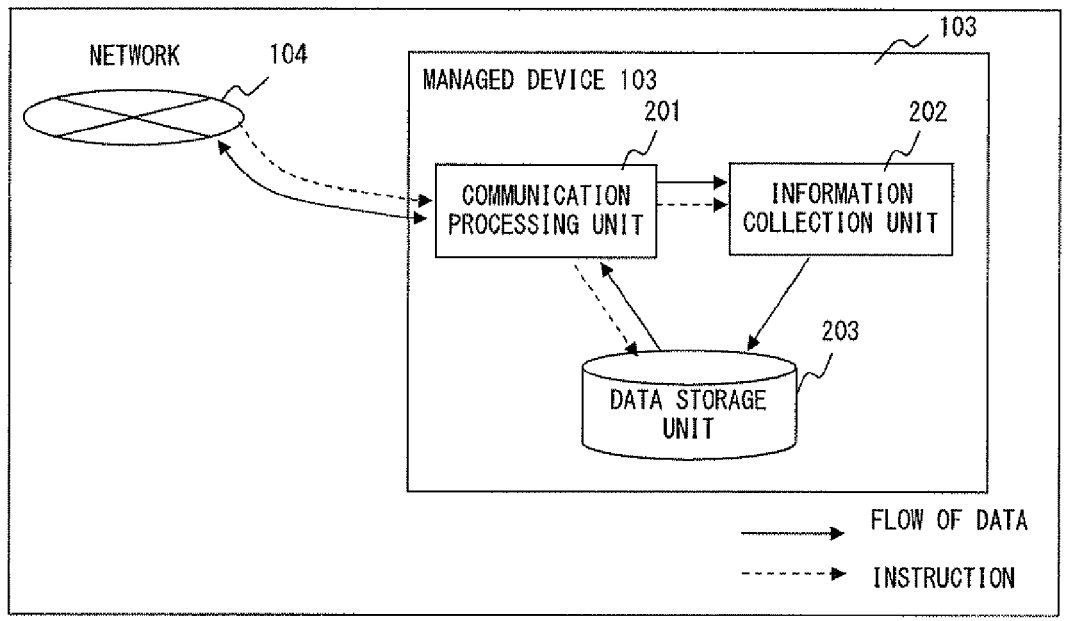
Figure 6:
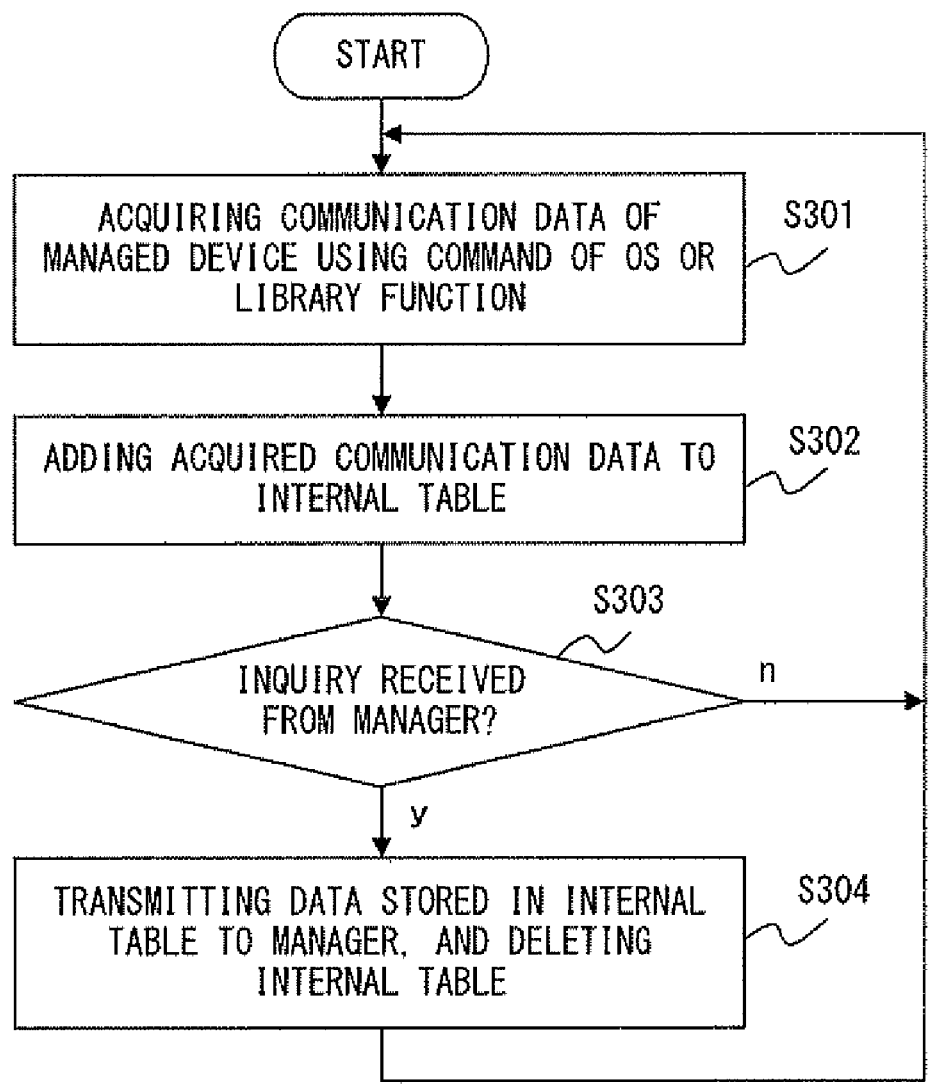
Figure 7:
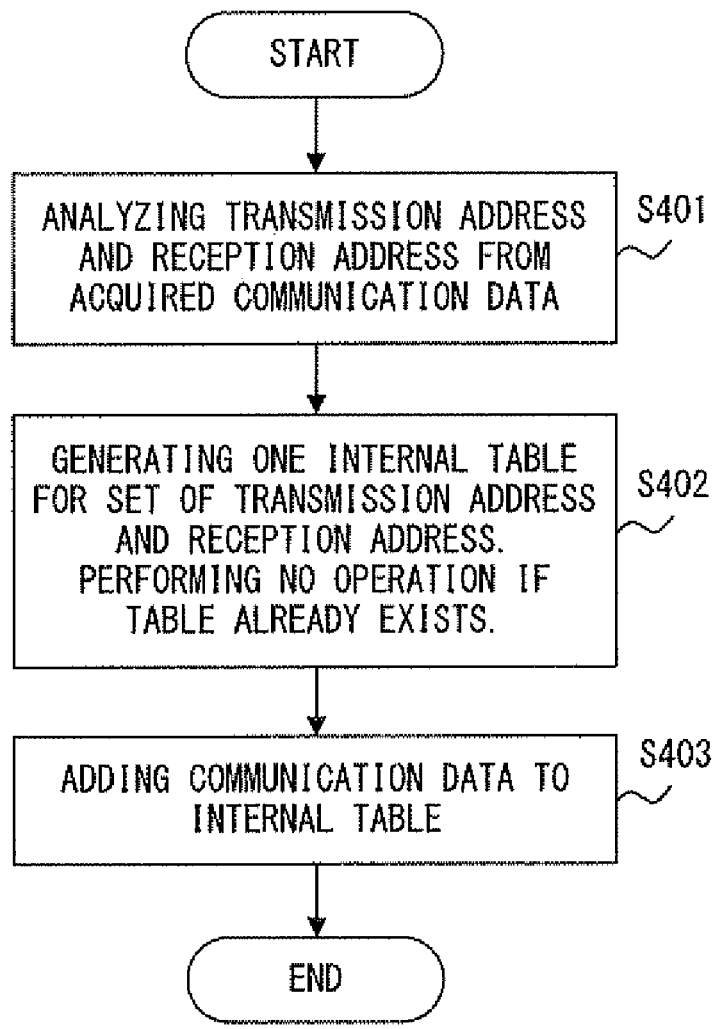
Figure 11:
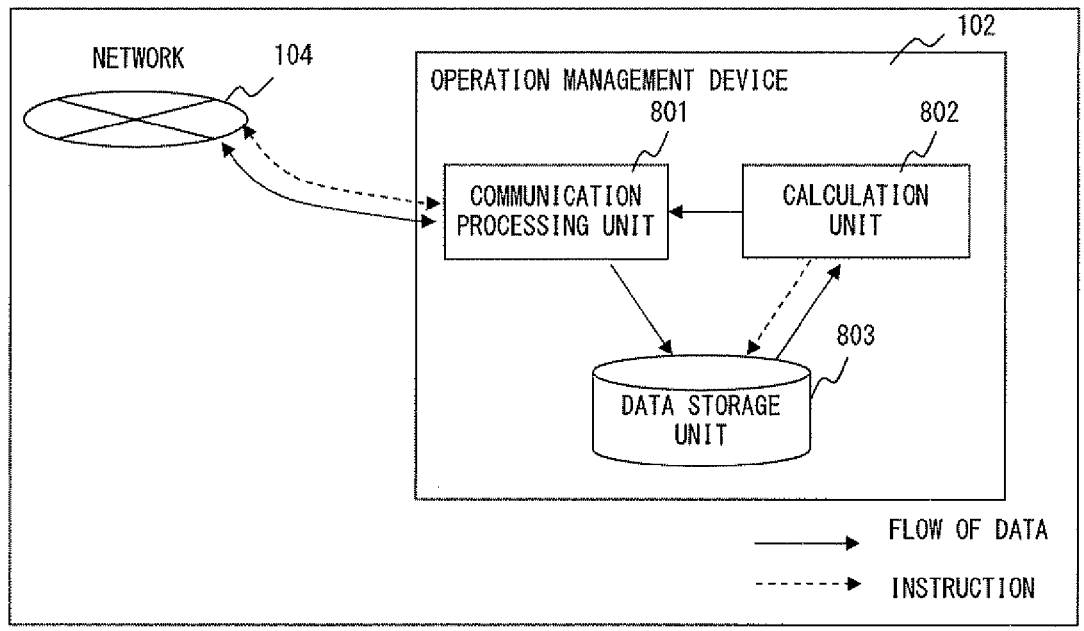
Figure 16:
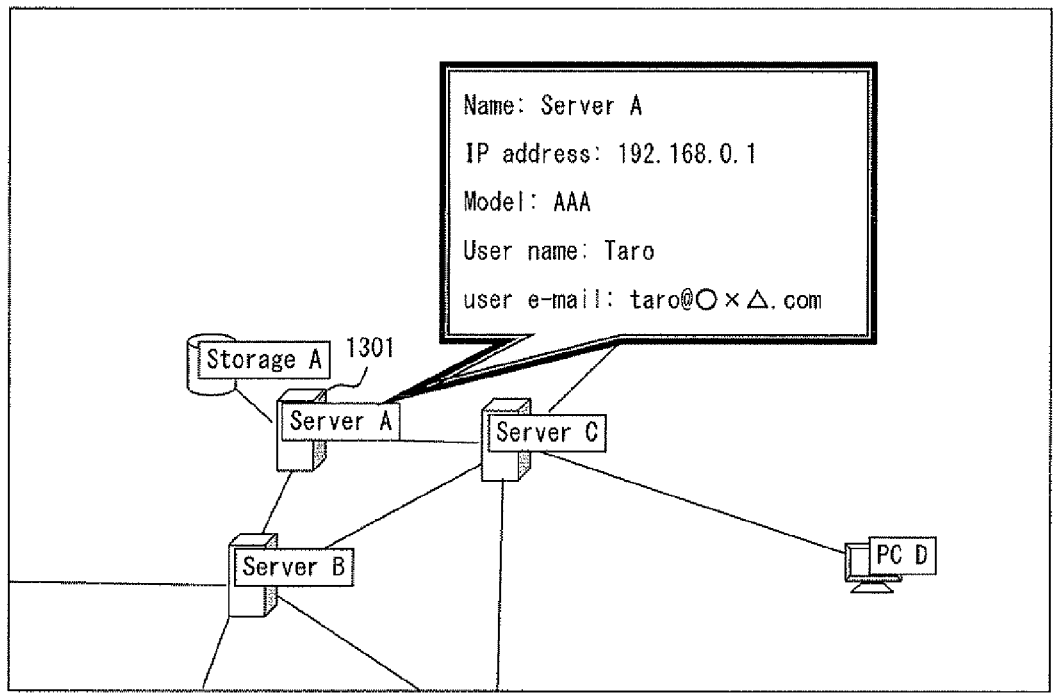
Figure 18:
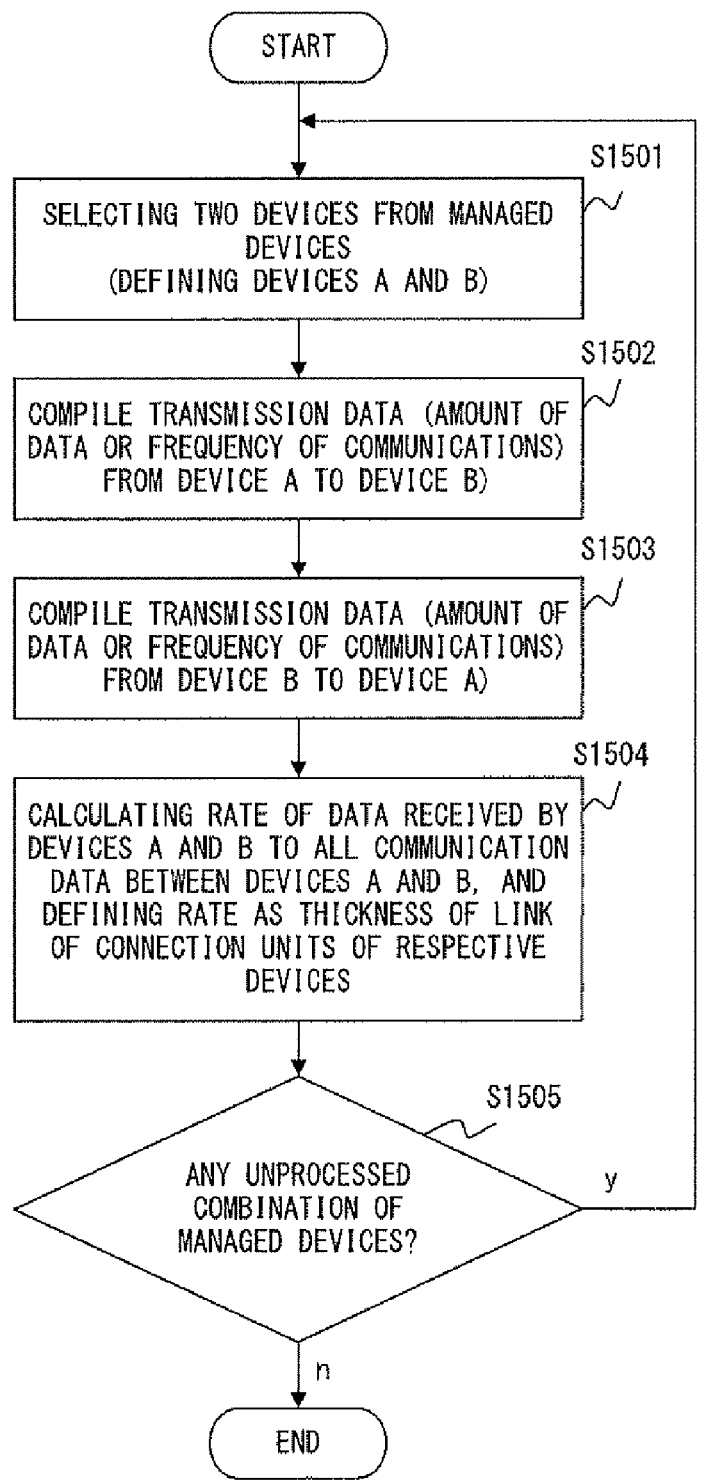
Figure 22:
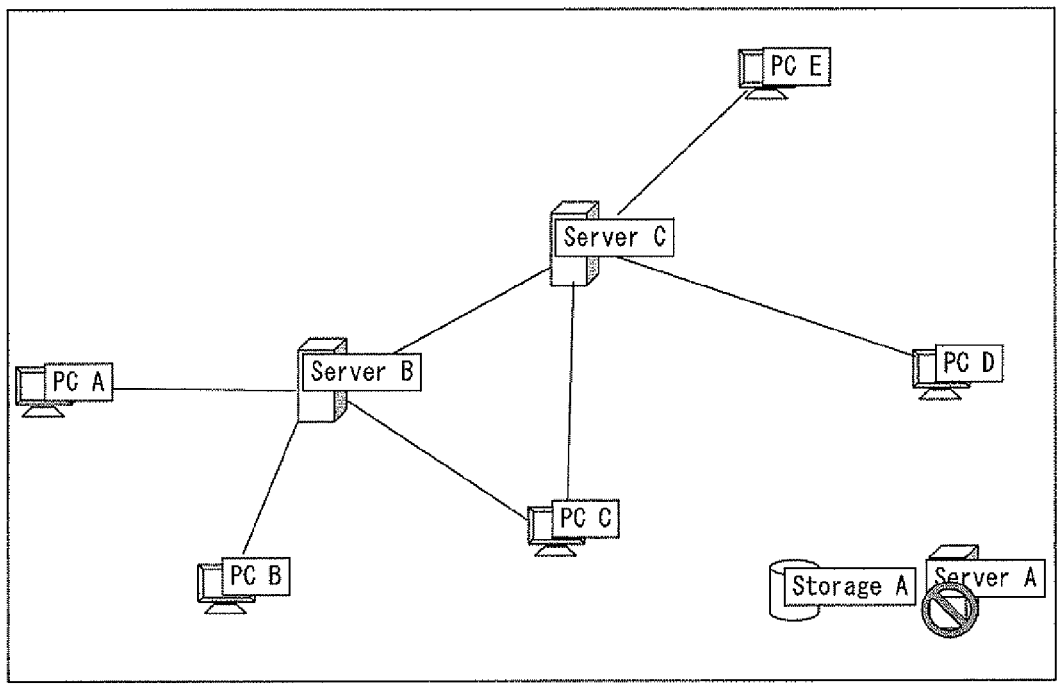
Figure 25:
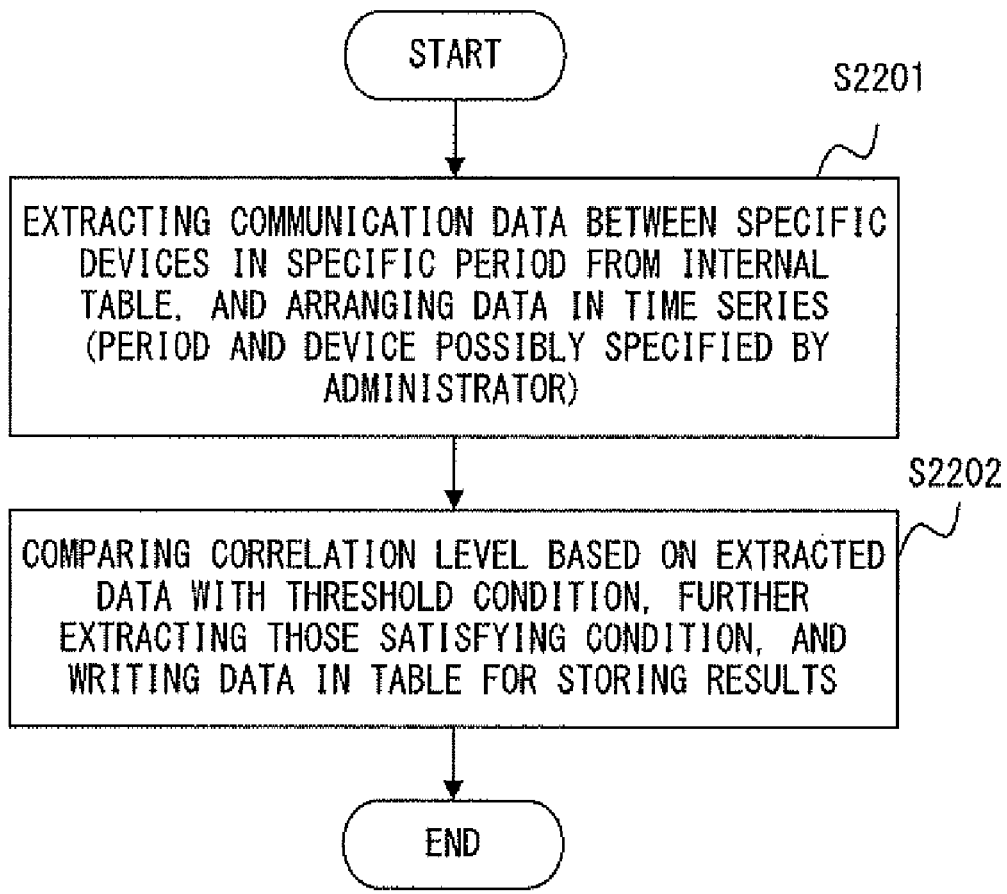

FIG. 1 depicts the conventional display method;
FIG. 2 depicts the conventional display method;
FIG. 3 depicts the conventional display method;
FIG. 4 depicts the configuration of the system according to an embodiment;
FIG. 5 is a block diagram depicting the functions of the agent operating with the managed device according to an embodiment;
FIG. 6 is a flowchart depicting the flow of the process of the agent according to an embodiment;
FIG. 7 is a detailed flowchart of step S302;
FIG. 8 depicts the format of the internal table;
FIG. 9 depicts communication data;
FIG. 10 depicts communication data;
FIG. 11 is a block diagram of the functions of the manager of an operation management apparatus;
FIG. 12 depicts the property of a managed device;
FIG. 13 is a flowchart of collecting communication data by the operation management apparatus according to an embodiment;
FIG. 14 is a flowchart of calculating the distance between the devices to be managed and generating display data;
FIG. 15 depicts an example of displaying a list of devices to be managed;
FIG. 16 depicts displaying the properties of devices;
FIG. 17 depicts the role of a device and its relationship;
FIG. 18 is a flowchart showing the procedure of calculating dependence;
FIG. 19 displays the relationships on the basis of dependence;
FIG. 20 depicts the display of a related device listing table;
FIG. 21 depicts an example of displaying a list of devices to be managed identified by colors of related links;
FIG. 22 depicts the relation when a device is faulty;
FIG. 23 depicts an example of displaying a list of devices to be managed;
FIG. 24 is a graph showing the relation between the devices A and B;
FIG. 25 is a flowchart of a calculation for extraction of a period;
FIG. 26 depicts an example of a table for storing results;
FIG. 27 is a graph showing the relation between the devices A and B; and
FIG. 28 depicts an example of displaying a list of devices to be managed.

DESCRIPTION OF EMBODIMENTS

A group of networks to which devices belong and a group defined by an administrator can be displayed, however, there have been the problems with the conventional technology that the correlation level and the dependence between the devices cannot be displayed on the basis of the actual progress of operations.

Embodiments of the present invention are described below with reference to the attached drawings.

FIG. 4 depicts the configuration of the system according to an embodiment of the invention.

The system according to an embodiment of the present invention includes a workstation 101, an operation management device 102, and a plurality of managed devices 103. The workstation 101, the operation management device 102, and the managed devices 103 are connected over a network 104.

In the workstation 101, a client of operation management software works to instruct the operation management device 102 to calculate coordinate data of each managed device 103, receives the coordinate data of each managed device 103, and displays a list of the managed devices 103.

In the operation management device 102, a manager of the operation management software works to collect the information about the managed devices 103, calculate the level of the relation between the managed devices 103 and the coordinate data of the managed devices 103, and answer to a request for coordinate data from the workstation 101.

The managed device 103 is a device to be managed by the operation management device 102, and can be, for example, a server, a storage device, a personal computer, etc. In each managed device 103, an agent of operation management software works.

FIG. 5 is a block diagram depicting the functions of the agent operating with the managed devices 103 according to an embodiment.

The agent of the operation management software operates with each managed device 103.

An agent comprises a communication processing unit 201, an information collection unit 202, and a data storage unit 203.

The communication processing unit 201 communicates with the devices such as the operation management device 102, another managed device 103, etc. connected over the network 104, and receives an instruction from the operation management device 102 to collect information.

The information collection unit 202 receives an instruction from the communication processing unit 201, collects communication data such as the transmission/reception time, the data size, the destination of the transmitted/received data of the managed device 103 from the communication processing unit 201, and adds the data to an internal table.

The data storage unit 203 stores the internal table which is described the communication data.

FIG. 6 is a flowchart depicting the flow of the process of the agent according to an embodiment.

In step S301, the information collection unit 202 acquires the communication data obtained as a result of the communications by the managed device 103 operated by the agent from the communication processing unit 201 using a command or a library function. The communication data relates to each communication performed by the managed device 103, and includes a communication time, a destination address, a data size, etc.

In step S302, the information collection unit 202 stores the acquired communication data in the internal table of the data storage unit 203.

In step S303, it is determined whether or not there is an inquiry from the manager, that is, the operation management device 102. When there is an inquiry from the manager (S303, y), control is passed to step S304. When there is no inquiry from the manager (S303, n), control is returned to step S301.

In step S304, the communication processing unit 201 transmits the communication data stored in the internal table to the manager, and the transmitted communication data is deleted from the internal table.

Described below in detail is the process of storing the acquired communication data in step S302.

FIG. 7 is a detailed flowchart describing process in step S302.

In step S401, the information collection unit 202 analyzes a transmission address and a reception address acquired from the communication data. A transmission address is the address of a device as a source of data, and a reception address is the address of a device for receiving the data.

In step S402, the information collection unit 202 prepares one internal table for a set of a transmission address and a reception address of the communication data. When there is already a table for the same set of the transmission address and the reception address, no process is performed.

In step S403, the information collection unit 202 adds the communication data to the internal table.

The format of an internal table is described below. As depicted in FIG. 8, the internal table includes as items a communication time, a transmission address, a reception address, and a data size.

Described next is a practical example of an internal table.

In this example, an internal table is prepared by an agent on the managed device having the IP address of 192.168.0.1. FIG. 9 depicts a transmission record to the managed device having the IP address of 192.168.0.2 from the managed device having the IP address of 192.168.0.1. FIG. 10 depicts a reception record on the internal table from the managed device having the IP address of 192.168.0.2 by the managed device having the IP address of 192.168.0.1. The transmission record depicted in FIG. 9 and the transmission record depicted in FIG. 10 are recorded on the internal table.

As depicted in FIGS. 9 and 10, the transmission record and the reception record are stored by the same agent. Therefore, when communication between the two managed devices is measured, the manager can acquire necessary data for the calculation of the relation between the managed devices although the communication data is stored in only one of the managed devices. Therefore, it is not always necessary to assign an agent to all managed devices. For example, although there is a device that cannot install an agent such as a storage device etc., a relation diagram can be prepared on the basis of communication data.

Described next is the operation management device 102.

FIG. 11 is a block diagram of the functions of the manager of an operation management device.

The manager of operation management software operates with the operation management device 102.

The manager comprises a communication processing unit 801, a calculation unit 802, and a data storage unit 803.

The communication processing unit 801 collects communication data accumulated by the agent of each managed device 103, and adds the collected communication data to the internal table of the data storage unit 803, and also outputs the coordinates of each managed device described later to the workstation 101. It also outputs an instruction to collect information to the managed device 103, and receives an instruction to calculate coordinates from the workstation 101.

The calculation unit 802 compiles the frequency of communications and the amount of communication between the managed devices from the communication data relating to each managed device stored in the data storage unit 803, calculates the coordinates of the managed devices for plotting each managed device on a two-dimensional plane, and outputs the result to the communication processing unit 801. In addition, it instructs the data storage unit 803 to store data.

The data storage unit 803 holds an internal table for storing communication data and various types of data.

The operation management device 102 prepares a property list storing the properties of the managed devices as depicted in FIG. 12.

The items of the properties can be, the name of a managed device (Name), the IP address of a managed device (IP address), the model of a managed device (Model), a user name (User name), the e-mail address of a user (User e-mail), the existence of an agent (Agent existence), etc.

The method of entering a property is to input by an administrator each piece of information about each managed device, and to automatically retrieve an environment to be managed, that is, a managed device that is connected to a network, and collect and enter the information about each managed device.

Described next is the procedure of collecting communication data by an operation management device.

FIG. 13 is a flowchart of collecting communication data by the operation management device according to an embodiment.

In step S1001, the communication processing unit 801 selects the first entered managed device in the managed devices entered in the property list.

In step S1002, the operation management device 102 refers to the property list and determines whether or not there is an agent for the selected managed device. If there is an agent for the selected managed device (S1002 y), control is passed to step S1003. If there is no agent (S1002 n), control is passed to step S1005.

In step S1003, the communication processing unit 801 requests the agent of the selected managed device to transmit communication data.

When the communication data is received from the managed device, the communication processing unit 801 adds the communication data acquired from the managed device to the internal table in step S1004.

The format of the internal table of the manager includes as items of the input internal table a communication time, a transmission address, a reception address, and a data size.

Since a table is prepared for a set of transmission address and a reception address in the managed device, the operation management device can acquire double communication data from two managed devices. In this case, the first acquired communication data is overwritten by the communication data acquired later, or the communication data acquired later is discarded, thereby avoiding double storage of communication data.

In step S1005, the communication processing unit 801 checks whether or not the selected managed device is the last entry of the property list. If the managed device is the last entry in the managed devices (S1005 y), control is passed to step S1007. If it is not the last entry in the managed devices S1005 n), control is passed to step S1006.

In step S1006, the communication processing unit 801 selects the next entry of the managed device from the property list, and control is returned to step S1002.

In step S1007, the managed device awaits the collection of the next communication data for a predetermined time, and control is returned to step S1001. The wait time can be arbitrarily set by the administrator.

Described next is calculating a distance between the managed devices and generating display data.

FIG. 14 is a flowchart of calculating the distance between the managed devices and generating display data.

In step S1101, the calculation unit 802 compiles the frequency of communications and the amount of communication between the managed devices in a specific period from the communication data stored in the internal table.

The specific period can be specified by the administrator.

In step S1102, the calculation unit 802 standardizes the frequency of communications or the amount of communication of the compiled communication data, and defines the sum of the standardized value and an appropriate reference value as the distance between the managed devices. The standardization is a data conversion performed by subtracting an average value from each piece of data and dividing the difference by a standard deviation. The reference value is a positive constant to be added to a standardized value to convert the distance between devices into a positive value.

Thus, the distance between the devices proportional to the frequency of communications or the amount of communication is obtained.

As described above, the distance between the managed devices is obtained depending on the level of the correlation.

The term "correlation" indicates the frequency of communications or the amount of communication. Therefore, the distance between the managed devices having a strong correlation (high frequency of communications or large amount of communication) is short, and the distance between the managed devices having a weak correlation (low frequency of communications or small amount of communication) is long.

In step S1103, the calculation unit 802 calculates the coordinates of each managed device to plot (arrange) each managed device on the two-dimensional plane.

The calculation of the coordinates of a managed device is performed in a method of a common graph layout. As a well-known method, there is a "spring embedder" classified as a force-directed method (reference document: P. Eades. "A Heuristic for Graph Drawing", Congressus Numerantium, 42, 149-160, 1984.).

The coordinates calculation result of the managed device in the operation management device 102 can be confirmed by the administrator from the workstation 101. At a request of the administrator, the operation management device 102 prepares graphic data on the basis of the calculated coordinates of the managed device and transmits the data to the workstation 101, and the workstation 101 displays the graphic data on the GUI. The display can be performed by the workstation 101, and can also be performed by the operation management device 102 when the operation management device 102 has a display device.

FIG. 15 depicts an example of displaying a list of managed devices displayed on the workstation 101.

As depicted in FIG. 15, the workstation 101 displays a list of managed devices 103 on the basis of the graphics data calculated by the operation management device 102. The managed devices 103 that have a strong correlation between them are displayed close to each other, and those having a low correlation with each other are displayed far from each other. The managed devices having a correlation are connected by a link.

The correlation between the managed devices is expressed as a link connecting the nodes indicating the managed devices. However, since a larger number of links can degrade the visibility of the display, it is possible to suppress the display of a low correlation as a link.

In this case, the administrator can adjust the visibility of the display by specifying the frequency of communications or the amount of communication as a threshold indicating whether or not the link is to be displayed, or by specifying the number of links to be displayed on the screen.

The managed device to be displayed is expressed by an icon with a label, and the administrator identifies the managed device by the shape of the icon or the label name. The icon indicates a managed device such as a server, a storage device, a personal computer, etc. as with the existing operation management software.

The label can be an identification name on the network, an IP address, a device model name, etc. They can be switched and displayed by the selection of the administrator, or a plurality of them can be combined.

FIG. 16 depicts displaying the properties of devices when a list of the managed devices is displayed.

The information about the property of a device etc. other than a label can be displayed by double-clicking on the managed device, for example, an icon 1301 of a server A in FIG. 16, or performing menu selection. The property to be displayed can be the name of the server A, an IP address, a model name, a user name, etc. The display item can be appropriately selected as necessary.

According to the operation management device of the embodiments of the present invention, the administrator can be informed which managed device is directly associated with a target managed device or which managed device is indirectly associated with the target managed device with reference to the correlation diagram as depicted in FIG. 15.

By knowing the level of the correlation between the managed devices from the correlation diagram, the administrator can grasp on which managed device the fault and maintenance of the target managed device directly or indirectly have an influence, and can determine which managed device is to be processed with the highest priority.

In addition, when a fault notification and is transmitted to a user or a maintenance schedule is adjusted, or a managed device that is related to a faulty managed device is stopped, it can be determined a managed device that is displayed closer to the target device to be monitored should be processed with the highest priority.

If the administrator grasps what role the managed device has in the entire system and how it is used, the administrator can determine the managed device that is to be processed with the highest priority from the display of a list as depicted in FIG. 15.

FIG. 17 is a schematic diagram depicting the roles of and the relationship among a plurality of managed devices. In FIG. 17, a server B as an application server is connected to the server A as a database server, and a server C as a Web server is connected to the server B. The server B refers to the server A, and the server C refers to the server B. If the administrator has grasped the relationship as depicted in FIG. 17, and when the server B is faulty, the administrator can determine that the process of the server C referring to the server B is assigned a higher priority than the process of the server A referred to by the server B.

However, if the administrator does not grasp what role in the entire system the target managed device has, and how the device is used, then additional information is required to determine which managed device is processed with the highest priority.

A method of indicating the dependence between the managed devices by directing a link between the managed devices as depicted in FIG. 15 is described below as a method of providing additional information.

The dependence between the managed devices is represented on the basis of the direction of the flow of the communication data. The managed device that receives data is considered to depend on the managed device that transmits data.

FIG. 18 is a flowchart depicting the procedure of calculating the dependence between the managed devices.

In step S1501, the calculation unit 802 selects two managed devices from among a plurality of managed devices. The two managed devices selected in FIG. 18 is defined as devices A and B.

In step S1502, the calculation unit 802 compiles the amount of data or the frequency of communications of the transmission data from the device A to the device B.

In step S1503, the calculation unit 802 compiles the amount of data or the frequency of communications of the transmission data from the device B to the device A.

In step S1504, the calculation unit 802 calculates the rate of the data received by each managed device in all communication data between the devices A and B, and represents the rate by the thickness of the link at the portion connected to each managed device.

In step S1505, the calculation unit 802 checks whether or not there is a combination of unprocessed managed devices. When there is a combination of unprocessed managed devices (S1505 y), control is returned to step S1501. When there is no combination of unprocessed managed devices (S1505 n), the process in FIG. 18 is terminated.

Then, the link between the devices is displayed on the basis of the thickness of the link calculated in step S1504 when the list of managed devices is displayed.

FIG. 19 depicts an example of a correlation diagram when the thickness of a link is changed depending on the rate of the amount of received data or the number of pieces of received data in the communications between the managed devices.

The higher the rate of the received data to the total amount of communication data between two managed devices, the thicker of the link connected to the managed devices. For example, in the communications between the server A and the server B, the link width of the server B is larger. That is, FIG. 19 depicts that the server B receives a larger amount of data from the server A, and the server B depends on the server A. On the other hand, the width of the link is substantially equal between the servers B and C. That is, in the communication between the servers B and C, the rate of transmission/reception to and from each other is substantially equal between the servers B and C. Thus, the servers B and C depend on each other.

By calculating the dependence between the managed devices and displaying a correlation diagram, the administrator can grasp the dependence between the managed devices. Thus, it can be considered that, during the fault and maintenance of a managed device, there occurs an influence on a managed device that depends on a target managed device, thereby determining a managed device that is to be processed with a high priority.

Display in the Table Format of a List of Related Devices

Using the connection diagrams depicted in FIGS. 15 and 19, the administrator can intuitively grasp the correlation in the entire managed devices. However, with an increasing number of managed devices that are related to a target managed device, the number of related devices having substantially equal lengths and thicknesses of links increases. Therefore, it is hard to determine during the fault and maintenance which managed device is to be processed with a high priority. In addition, when there is a large number of related devices, the operation of confirming the properties of related devices becomes complicated, and the efficiency is degraded.

The operation management device according to the embodiments of the present invention has the function of displaying a list of managed devices that relate to a target managed device in a table format as depicted in FIG. 20, and rearranging the managed devices in an order specified by the administrator.

The arrangement order of the related devices can be selected and specified by the administrator. FIG. 20 depicts an example of displaying managed devices in a descending order of the amount of transmission/reception data to and from the target managed device, but the managed devices can be rearranged on the basis of the amount of received data and the frequency of communications.

By displaying a list of related devices in a table format, the administrator can easily determine which managed device is processed with a high priority during a fault and maintenance. in addition, by displaying a list of properties of related devices, the work efficiency can be improved.

For example, when the administrator adjusts the schedule of maintenance, the administrator can determine for a schedule with a higher program with the user of the managed device that receives a large amount of data from the managed device and maintained. In addition, the user information about a plurality of managed devices can be simultaneously confirmed in the table format.

Visualization of Fluctuation of Correlation

The correlation between the managed devices is calculated on the basis of the communication data between the managed devices in a specific period. Generally, by inputting a measurement value for a longer period, a substantially average result can be obtained.

However, with a device in a specific environment, a calculation result in a longer period does not necessarily indicate an appropriate correlation for a fault and maintenance. For example, when a user of a managed device and a method of using the device are changed each week, only the latest obtained measured data can correctly indicate the correlation between the managed devices.

In the embodiments of the present invention, the average value of the data acquired during the target period of the calculation of the correlation between the managed devices is compared with the average value of the data in a short latest period. Then, the correlated link between the managed devices is represented by a specific color depending on the difference between the average value of the data acquired during the target period of the calculation and the average value of the data in the short latest period, thereby visualizing the fluctuation of the correlation between the devices to be managed. The "total period" and "latest period" to be considered in the calculation can be specified by an administrator.

In the embodiments of the present invention, the difference between the average values is calculated, and the correlation link is classified into large, medium, and small depending on the value. Then, the correlation links are displayed in different colors depending on the classification.

Thus, the list of managed devices is displayed with links of related devices in respective colors as depicted in FIG. 21.

The function is an option of the displaying method in the above-mentioned "visualization of the correlation level between the devices" and "visualization of the dependence between the devices".

By displaying the links between the managed devices by the respective colors, the administrator can be informed whether or not the target managed device is being used on an average while grasping the entire environment on the basis of an average correlation. if the difference from the average is large, the entire period to be calculated can be shortened by specification, to check the current use state of the managed device, and the result can be a determination criterion for a managing operation.

Display of Past Correlation Diagram

If there is a fault in the managed device and an abnormality occurs in the communication, the display of a list of managed devices can be different from that in the normal operation when the correlation is calculated with the latest measurement value of communications. FIG. 22 depicts a list of managed devices when the server A becomes faulty in the same environment as in FIG. 15 and cannot communicate with other devices. FIG. 22 displays the server A and storage A separate from other managed devices.

From the drawing of the state as depicted in FIG. 22, the server A is separate in the display from other managed devices. Therefore, it cannot be grasped on which managed device the influence of the fault of the server A is exerted.

On the other hand, in the embodiments of the present invention, the correlation diagram in the previous time points can be displayed.

According to the embodiments of the present invention, the measured value of the past communication is also accumulated and stored. If the period to be calculated is set as a past time point, the measured value corresponding to the corresponding period is extracted, and the correlation diagram showing the correlation between the managed devices at the time point can be displayed.

For example, if the administrator is informed of the fault of the server A by the alarm function of the operation management software, and the fault can cause an abnormality of a communication system, then the correlation diagram of the server A in the normal operation can be confirmed by setting the related calculation period as a time point before the fault of the server A. The administrator determines from the diagram the managed device subject to the influence of the fault of the server A to process the device with a high priority.

Display of the Correlation Diagram in a Specific Time Period

Depending on the time period, there can be a large difference in the correlation between the managed devices. For example, there can be a difference in the amount of communication between the managed devices between the daytime and the nighttime, the busy period and other periods, etc. In the correlation diagram, the correlation appears in the daytime as depicted in FIG. 15, and can appear in the nighttime as depicted in FIG. 23 between the servers B and C.

When there is a difference in the correlation between the managed devices depending on the time period, the function of displaying the correlation between the managed devices for a narrowed specific time period. With the function, a work schedule can be prepared for a time period in which the influence of the maintenance of the managed device is small when the maintenance is performed.

The correlation diagram of a specific period can be prepared by setting a short measurement period for the related calculation in the above-mentioned method in the "visualization of the correlation level between the devices" and "visualization of the dependence between the devices".

However, only by shortening the period, the number of samples of the communication data for calculation of the corresponding between the managed devices is small, and the correlation depending on the situation of the period to be calculated is displayed.

Thus, in the embodiments of the present invention, a period is set to calculate an average correlation in a target time period, and the target time period in the present embodiment is defined as a period for calculation of the correlation, thereby appropriately narrowing the target period for calculation of the correlation. In addition, the target period for calculation of the correlation can be periodically narrowed such as every day, a specific day of each month, etc.

FIG. 24 is a graphics depicting the change with time of the correlation level between the device A and the device B. In FIG. 24, the horizontal axis indicates the date and time, and the vertical axis indicates the correlation level indicated by "level" in the figure. In FIG. 24, the correlation level indicates a relative value. That is, "10" indicates the highest correlation, and "0" indicates the lowest correlation.

For example, the period indicated by the dotted portion in the graph of FIG. 24 is a target period. The function is an option of the "visualization of the correlation level between the devices" and "visualization of the correlation level between the devices".

To narrow the period, the administrator specifies the following items.

Period for calculation (starting year/month/day (time as necessary) through ending year/month/day (time as necessary)

Cycle for calculation (every month/every week/every day, etc.)

Time period for calculation (starting time through ending time)

In the calculation of the correlation, the correlation between the managed devices is calculated using only the communication data generated in the specified period. When the cycle is specified, the graph of the correlation as depicted in FIG. 24 probably support the determination of the administrator, or any data analysis tool may obtain a cycle if possible.

Thus, by calculating the correlation between the managed devices by setting the time period, a work schedule can be prepared by selecting a time period having a small influence of the maintenance work the devices when the work is performed.

The Extraction of the Period in Which the Correlation Between the Managed Devices Satisfies a Specified Condition, and the Display of the Correlation Diagram The case in which the correlation between the managed devices fluctuates depending on the non-periodic events can be considered. For example, a case where communications relating to specific managed devices increase immediately after holidays, or a case where communications increase immediately after the publication of a product can be considered.

In the present embodiments, a support function for the administrator to analyze a non-periodic event is provided.

In the present embodiment, a correlation between certain managed devices is considered, and the period in which the correlation has a specific level is extracted. A threshold is set for the correlation between specific managed devices, and the period in which the correlation level exceeds the threshold is extracted. Practically, the amount of communication or the frequency of communications between the managed devices is used as the correlation between the managed devices.

The procedure of the calculation for extraction of a period is described as follows.

FIG. 25 is a flowchart of a calculation for extraction of a period.

In step S2201, the operation management device 102 extracts communication data between specific devices in a specific period from the internal table, and arranges the extracted communication data in a time series. The period and the devices can be specified by the administrator.

In step S2202, the operation management device 102 calculates the correlation level on the basis of the frequency of communications or the amount of communication of the extracted communication data, compares the calculated correlation level with the threshold conditions, extracts the communication data satisfying the conditions, and writes the data in the table for storage of the results as depicted in FIG. 26. The correlation level can be obtained by standardizing the frequency of communications or the amount of communication, and adding an appropriate reference value to the standardized value.

FIG. 26 is a graph depicting a change with time of the correlation between the devices A and B. In FIG. 26, the horizontal axis indicates the date and time, and the vertical axis indicates the correlation level between the devices. In FIG. 26, a threshold for comparison between the correlation levels is set, and the state in which the correlation level exceeds the threshold is extracted is depicted in FIG. 26.

FIG. 27 depicts the time period in which the correlation is calculated and the correspondence between the correlation level in the time period and the maximum level. FIG. 27 specifically depicts the table indicating the extraction of the period in which the correlation level exceeds the threshold depicted in FIG. 26.

The administrator can confirm the extracted period on the graph depicted in FIG. 27 (the dotted portion refers to the extracted period), and also can confirm it in the table format as depicted in FIG. 26.

Thus, the administrator can be informed of the period in which the correlation between the two target managed devices is strong. The result supports the analysis as to what event strengthens the correlation between the target managed devices by using and comparing the log of the applications remaining in each managed device and the affairs in the period. If the event can be detected, a maintenance schedule can be adjusted by avoiding the event.

The present embodiments provide the function of calculating the correlation in the entire system including other managed devices using the communication data in the extracted period as another analyzing means. By the function, the administrator can be informed which managed device is related to the correlation level between specific managed devices.

For example, in the system depicted in FIG. 15, it is assumed that the correlation diagram depicted in FIG. 28 is obtained as a result of calculating the correlation between the managed devices using the communication data in the period in which the correlation between the storage A and the server A is especially strong.

When FIG. 15 is compared with FIG. 28, the PC E is closer to the storage A and the server A in FIG. 28 as compared with FIG. 15.

In this case, as a result of the comparison between FIGS. 15 and 28, it can be predicted that the PC E relates to the correlation between the storage A and the server A.

As a result, the administrator can make an adjustment with a user of the PC E high a higher priority by hearing a user of the PC E when surveying an event in which the degree of use of the server A is high, and considering the maintenance schedule of the storage A.

According to the present embodiments, the correlation level and the dependence between the information processing devices can be easily grasped, and the devices can be managed with the influence by operations taken into account.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An operation management device which manages operations of managed devices, comprising:
    an information collection unit that acquires communication data corresponding to communication between the managed devices; and
    a calculation unit that calculates correlations between any two of the managed devices using the acquired communication data between the two managed devices, and calculates coordinates of each managed device for arranging the managed devices on a two-dimensional plane based on the calculated correlations where the coordinates reflect a strength of correlation between the managed devices, wherein the correlation between two managed devices is calculated on a basis of a frequency of communications or an amount of communication between the two managed devices.

2. The device according to claim 1, wherein the calculation unit calculates dependence between two managed devices on a basis of the acquired communication data between the two managed devices.

3. The device according to claim 2, wherein the dependence between two managed devices is calculated on a basis of a rate of data received by one of the of all communication data between the two managed devices.

4. The device according to claim 1, wherein the calculation unit calculates the correlation between two managed devices using the communication data corresponds to communication between the two managed devices in a specific period.

5. The operation management device according to claim 1, wherein the calculation unit calculates a distance between two managed devices on the two-dimensional plane on the basis of the calculated correlation between the two managed devices, the distance between two managed devices on the two-dimensional plane indicates a strength of the correlation between the two managed devices.

6. The operation management device according to claim 1, wherein the coordinates is calculated so that a distance between the two managed devices on the two-dimensional plane is short according to the frequency of communications or the amount of communication between the two managed devices.

7. A display method of an operation management device which manages operations of managed devices, comprising:

acquiring communication data corresponding to communication between any two managed devices;

calculating a correlation between two managed devices by using the acquired communication data between the two managed devices;

calculating coordinates of each managed device for arranging the managed devices on a two-dimensional plane based on the calculated correlations; and displaying each managed device on the two-dimensional plane on a basis of the calculated coordinates, wherein the coordinates of each managed device on the two-dimensional plane is calculated on a basis of a frequency of communications or an amount of communication between the managed devices.

8. The method according to claim 7, further comprising a procedure of calculating dependence between the managed devices on a basis of the acquired communication data.

9. The method according to claim 8, wherein the dependence between managed devices is calculated on a basis of a rate of received data of all communication data between the managed devices.

10. The method according to claim 7, further comprising:

calculating a distance between two managed devices on the two-dimensional plane based on the calculated correlation between the two managed devices, the distance indicates a strength of correlation between two managed devices.

11. The method according to claim 10, wherein the distance between the two managed devices on the two-dimensional plane is calculated on the basis of a level of correlation between the two managed devices.

12. A record medium storing a program used to direct an operation management device which manages operations of managed devices to perform the process, comprising:

a procedure of acquiring communication data corresponds to communication between any of two managed devices;

a procedure of calculating coordinates of each managed devices when the managed devices are arranged on a two-dimensional plane, where the coordinates reflect a strength of correlation between the managed devices; and a procedure of outputting the coordinates, wherein the coordinates is calculated on a basis of a frequency of communications or an amount of communication between the managed devices.

13. The medium according to claim 12, further comprising a procedure of calculating dependence between the managed devices on a basis of the communication data.

14. The medium according to claim 13, wherein the dependence is calculated on a basis of a rate of received data of all communication data between the managed devices.

15. The medium according to claim 12, wherein the program further comprising:

a procedure of calculating a distance between two managed devices on the two-dimensional plane on the basis of the calculated correlation between the two managed devices, wherein the distance on the two-dimensional plane indicates a strength of the correlation between two managed devices.

* * * * *